(12) United States Patent
Pilard

(10) Patent No.: US 12,124,030 B2
(45) Date of Patent: Oct. 22, 2024

(54) OPTICAL COMBINATION DEVICE FOR PROJECTING AN IMAGE

(71) Applicant: Robert Bosch GmbH, Stuttgart (DE)

(72) Inventor: Gael Pilard, Wankheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 821 days.

(21) Appl. No.: 17/261,440

(22) PCT Filed: Oct. 10, 2019

(86) PCT No.: PCT/EP2019/077442
§ 371 (c)(1),
(2) Date: Jan. 19, 2021

(87) PCT Pub. No.: WO2020/104098
PCT Pub. Date: May 28, 2020

(65) Prior Publication Data
US 2021/0302725 A1    Sep. 30, 2021

(30) Foreign Application Priority Data

Nov. 22, 2018  (DE) .......................... 102018220017.3

(51) Int. Cl.
*G02B 27/00* (2006.01)
*G02B 27/01* (2006.01)

(52) U.S. Cl.
CPC ..... *G02B 27/0081* (2013.01); *G02B 27/0172* (2013.01); *G02B 2027/0174* (2013.01)

(58) Field of Classification Search
CPC .......................... G02B 27/01; G02B 27/0101; G02B 27/0172; G02B 27/0031; G02B 27/0081;
(Continued)

(56) References Cited

U.S. PATENT DOCUMENTS 5,224,198 A     6/1993  Jachimowicz et al.
11,157,072 B1 * 10/2021 Topliss ............... G02B 27/0093
(Continued)

FOREIGN PATENT DOCUMENTS

DE  102014224189 A1  6/2016
EP       2887128 A1  6/2015
(Continued)

OTHER PUBLICATIONS

International Search Report for PCT/EP2019/077442, Issued Jan. 14, 2020.

*Primary Examiner* — Sultan Chowdhury
(74) *Attorney, Agent, or Firm* — NORTON ROSE FULBRIGHT US LLP; Gerard A. Messina

(57) ABSTRACT

An optical combination device for projecting an image onto an impingement region. The device includes at least a first and a second layer which are mutually spaced apart at a distance. The first layer has a shorter distance to the impingement region than the second layer. The first layer has at least two functional regions which are mutually spatially separate. The first and the second layers are formed to transmit a portion of the beam, which is incident on a first functional region, in the direction of the second layer, and to propagate the transmitted portion between the first and second layers at least partially along a direction of extent of the at least two layers, and to provide the at least partially propagated beam as outgoing beam in the direction of the impingement region via a second functional region of the first layer.

13 Claims, 3 Drawing Sheets

(58) Field of Classification Search
CPC .......... G02B 27/144; G02B 2027/0107; G02B 2027/0123; G02B 2027/0125; G02B 2027/0174; G02B 2027/0178
See application file for complete search history.

(56) References Cited

U.S. PATENT DOCUMENTS

| | | |
|---|---|---|
| 2004/0174348 A1 | 9/2004 | David |
| 2006/0132914 A1 | 6/2006 | Weiss et al. |
| 2015/0362734 A1 | 12/2015 | Moser et al. |
| 2016/0033771 A1* | 2/2016 | Tremblay ............... G02B 26/10 359/851 |
| 2016/0225293 A1 | 8/2016 | Basset et al. |
| 2016/0327797 A1* | 11/2016 | Bailey .................. G03H 1/2645 |
| 2017/0031161 A1 | 2/2017 | Rossini |
| 2017/0307886 A1 | 10/2017 | Stenberg et al. |
| 2017/0329140 A1* | 11/2017 | Yeoh .................... G02B 6/0031 |
| 2018/0299678 A1 | 10/2018 | Singer et al. |
| 2018/0321736 A1* | 11/2018 | Masson .................. G02B 30/36 |
| 2019/0041565 A1* | 2/2019 | Masson ................ G03H 1/0248 |
| 2020/0174255 A1* | 6/2020 | Hollands ................. G02B 6/00 |

FOREIGN PATENT DOCUMENTS

| | | |
|---|---|---|
| JP | 2007219106 A | 8/2007 |
| JP | 2008112187 A | 5/2008 |
| WO | 2016142707 A1 | 9/2016 |
| WO | 2017011799 A1 | 1/2017 |
| WO | 2018108800 A1 | 6/2018 |

* cited by examiner

OPTICAL COMBINATION DEVICE FOR PROJECTING AN IMAGE

FIELD

The present invention relates to an optical combination device for projecting an image into a specific impingement region, in particular an eye of a person.

The present invention also relates to a method for projecting an image into a specific impingement region, in particular into an eye of a person.

The present invention also relates to a projection system including an illumination device for providing an image and an optical combination device.

Although the present invention is generally applicable to any optical combination devices, it is described with reference to head-mounted combination systems, for example, eyeglasses for displaying augmented reality.

BACKGROUND INFORMATION

Systems for displaying an augmented reality superimpose a virtual image onto a real image. In the automotive industry, for example, such systems are known as head-up displays or, in the field of computer applications, also as "smart glasses" which, alternatively or additionally to the ambient surroundings, can be used to project an image onto the eye of a person.

A system is described in U.S. Patent Application 2015/0362734 A1 in which a laser scanner system projects an image directly onto the retina through the pupil of an eye of a user. To this end, a holographic combining element is used which deflects the light onto the pupil of the user.

PCT Application WO 2017/011799 A1 describes a head-up display having a combination element, the combination element directing the image of a display unit to an observer. For this purpose, the combination element has a plurality of holographic layers, each layer having an interference pattern. The holographic layers can be configured to be switchable, so that they can be switched on or off.

A head-up display system having a combination element is also described in German Patent Application No. DE 10 2014 224 189 A1, the combination element being able to direct light to a viewing location. In this case, the combination element may have one or a plurality of holograms, in particular a multiplexing hologram. The holograms can be disk-shaped and, in the direction of view, be disposed one behind the other, each hologram defining a segment having an eyebox.

SUMMARY

In one specific embodiment, the present invention provides an optical combination device for projecting an image onto a specific impingement region, in particular onto an eye of a person. In accordance with an example embodiment of the present invention, the optical combination device includes at least a first and a second layer which are mutually spaced apart at a distance, and the first layer having a shorter distance to the impingement region than the second layer, and the first layer having at least two functional regions, and a first functional region and a second functional region of the at least two functional regions being spatially separate from one another, and the first and second layers being formed to transmit a portion of the beam incident to the first functional region in the direction of the second layer and to propagate the transmitted portion between the first and second layers at least partially along a direction of extent of the at least two layers, and to provide the at least partially propagated beam as outgoing beam in the direction of the impingement region via the second functional region of the first layer.

In another specific embodiment, the present invention provides a method for projecting an image onto a specific impingement region, in particular an eye of a person. In accordance with an example embodiment of the present invention, the method includes the following steps a beam impinging on a first functional region of a first layer;

at least a portion of the incident beam being transmitted toward a second layer by the first functional region of the first layer; the second layer being configured at a distance to the first layer; and the second layer being more distant to the impingement region than the first layer;

the transmitted portion of the incident beam being at least partially propagated between the first and second layers along a direction of extent of the at least two layers;

at least a portion of the at least partially propagated beam exiting via a second functional region of the first layer in the direction of the impingement region; the second functional region being spatially separate from the first functional region.

In another specific embodiment, the present invention provides a projection system including an illumination device for providing an image and an optical combination device for projecting the image of the illumination device into a specific impingement region, in particular an eye of a person.

In particular with respect to the transmitted portion of the incident beam, the term "propagate" is to be understood in the broadest sense and refers to the transmission, relaying, dissemination, and propagation of light, in particular of the transmitted portion of the incident beam.

One of the thereby attained advantages is that a plurality of eyeboxes, which are mutually spaced apart at different distances, may be readily produced on the pupil of a user, so that eye movements of the user are taken into account, because, even during eye movements, he/she sees a sharp image through the eyeboxes configured in different positions on the pupil. Moreover, it is advantageous that the eyebox resulting from the plurality of eyeboxes is larger, which makes possible higher-resolution images while, at the same time, the eyebox is of sufficient size. Another advantage is that an extremely compact optical combination device may be provided. The term "eyebox" is understood, in particular to be that three-dimensional space within which at least one eye of a person is able to completely see a generated image. In other words, an "eyebox" is that spatial region within which a person is able to utilize, respectively recognize the functions of the projection system.

Other features, advantages and further specific embodiments of the present invention are described in the following or become thereby apparent.

According to an advantageous further refinement of the present invention, the first and the second functional regions of the first layer are separated by at least one third functional region. Thus, on the one hand, the distance between the first and the second functional regions is increased; on the other hand, the flexibility is increased since an optical function may be provided by the third functional region between the first and the second functional regions for a beam that is incident thereon.

In accordance with another advantageous embodiment of the present invention, the at least one third functional region of the first layer is formed as a reflection region in such a way that the beams incident thereon are reflected. This makes it possible for beams to be readily transmitted and, likewise, for the functional region to be readily formed.

In another advantageous embodiment of the present invention, the second layer has at least a fourth functional region which is formed as a reflection region; in particular all functional regions of the second layer are formed as reflection regions. This makes possible a cost-effective manufacturing of the second layer; at the same time, a simple "waveguide function" is made possible parallel to the first and second layers.

Another advantageous embodiment of the present invention provides that the functional regions of the first layer be formed to each provide a splitting or a transmission function. Thus, on the one hand, a beam that is incident on the first layer may be split or simply transmitted further to the second layer.

In accordance with another advantageous embodiment of the present invention, at least one functional region is formed to provide a position-dependent and/or incident angle-dependent optical function for an incident beam. This makes it possible for an optical function to be provided accurately and, at the same time, flexibly for a beam that is incident to a functional region.

In accordance with another advantageous embodiment, the distance between the first and second layers, and the first functional region of the first layer are formed in such a way that, as a function of the angle of incidence, a projected cross-sectional area of the beam, which is incident to the second layer, is smaller than or equal to a functional region of the second layer. Here, the advantage is derived that a "crosstalk" is prevented, and the reliability of the projection of the image onto the impingement region is enhanced.

Another advantageous embodiment of the present invention provides that a functional region include one or a plurality of holograms, in particular a multiplex hologram. Here, the advantage is derived that an accurate and flexible optical function may be readily provided.

In accordance with another advantageous embodiment of the method in accordance with the present invention, the transmission is carried out by functional regions of the first and second layers in the form of reflection regions. Thus, the transmitted beam may be retransmitted readily and, at the same time, reliably.

Other important features and advantages of the present invention may be derived from the figures and the corresponding detailed description with reference to the figures.

It is understood that the aforementioned features and those which are still to be explained in the following may be used not only in the particular stated combination, but also in other combinations or alone without departing from the scope of the present invention.

Preferred embodiments and specific embodiments of the present invention are illustrated in the figures and are explained in greater detail in the following description, the same reference numerals relating to the same, similar or functionally equivalent components or elements.

DETAILED DESCRIPTION OF EXAMPLE EMBODIMENT

Figure 1:
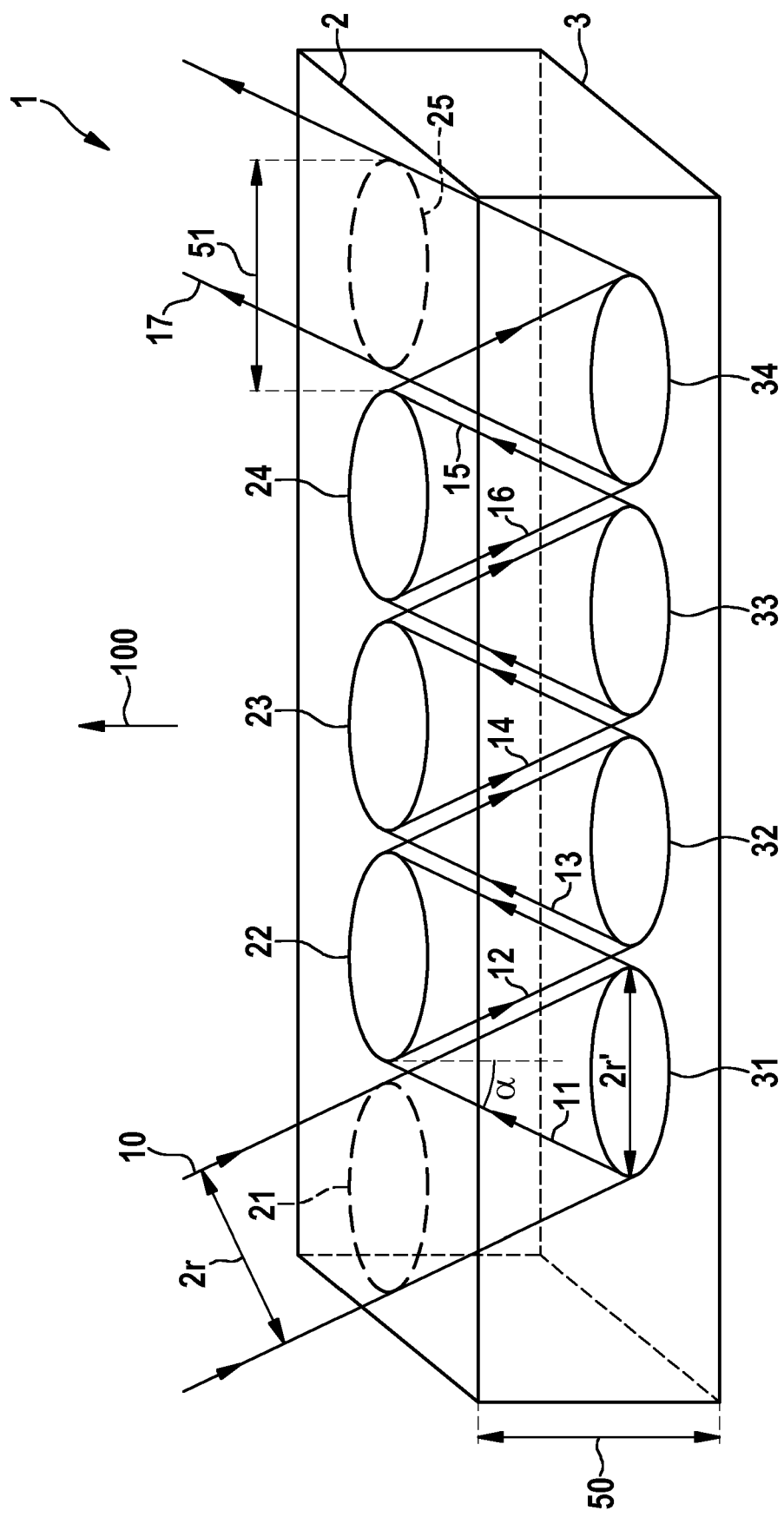
FIG. 1 shows an optical combination device in accordance with a specific embodiment of the present invention.

FIG. 1 schematically shows an optical combination device in accordance with a specific embodiment of the present invention.

An optical combination device 1 is shown in detail in FIG. 1. Optical combination device 1 thereby has a first layer 2 and a second layer 3; in direction 100 toward an impingement region, first layer 2 having a shorter distance thereto. The two layers 2, 3 are thereby spaced apart by a distance 50. If, at this stage, a beam 10 having a circular cross section having a diameter of 2r impinges on first layer 2, a region 21 projected onto first layer 2 hereby results. Upon receiving a circular beam 10, the surface of region 21 has a larger radius r' than that of incident beam 10 when incident beam 10 impinges at an angle on first layer 2. Region 21 is formed as a functional region, thus provides an optical function for incident beam 10.

At this stage, incident beam 10 is propagated further by functional region 21 in the direction of second layer 3 through first layer 2 at an angle of incidence a that corresponds to that of incident beam 10. At this stage, in the direction of the rear side of first layer 2, this is reflected again off of second layer 3 by a functional region 31 of second layer 3 formed as reflection region-beam 11. This beam 11 then impinges on a functional region 22 of first layer 2 and is reflected by it again in the direction of second layer 3—beam 12. In response to repeated reflection at second layer 3—functional regions 32, 33, 34 including incident beams 12, 14, 16 and, at first layer 2—functional regions 23, 24 including incident beams 13, 15—incident beam 10 is transmitted essentially perpendicularly to the direction of incidence and thus perpendicularly to direction 100, respectively parallel to the direction of extent of the two layers 2, 3. In other words, the beam is reflected back and forth between the two layers 2, 3. Finally, beam 17 impinges on a functional region 25 of first layer 2, which is formed not to be reflective, but transmissive. Beam 17 exits first layer 2 via functional region 25 in direction 100 toward a desired impingement region. To form corresponding functional regions 21, 22, 23, 24, 25, 31, 32, 33, 34 as functional regions which provide corresponding optical functions, they may include one or a plurality of holograms and/or one or a plurality of diffractive optical elements, for example, optical gratings. The particular functional regions 21, 22, 23, 24, 25, 31, 32, 33, 34 are mutually spaced apart here, i.e., diameter 2r' of the functional regions is smaller than mutual spacing p thereof—reference numeral 51.

Figure 2:
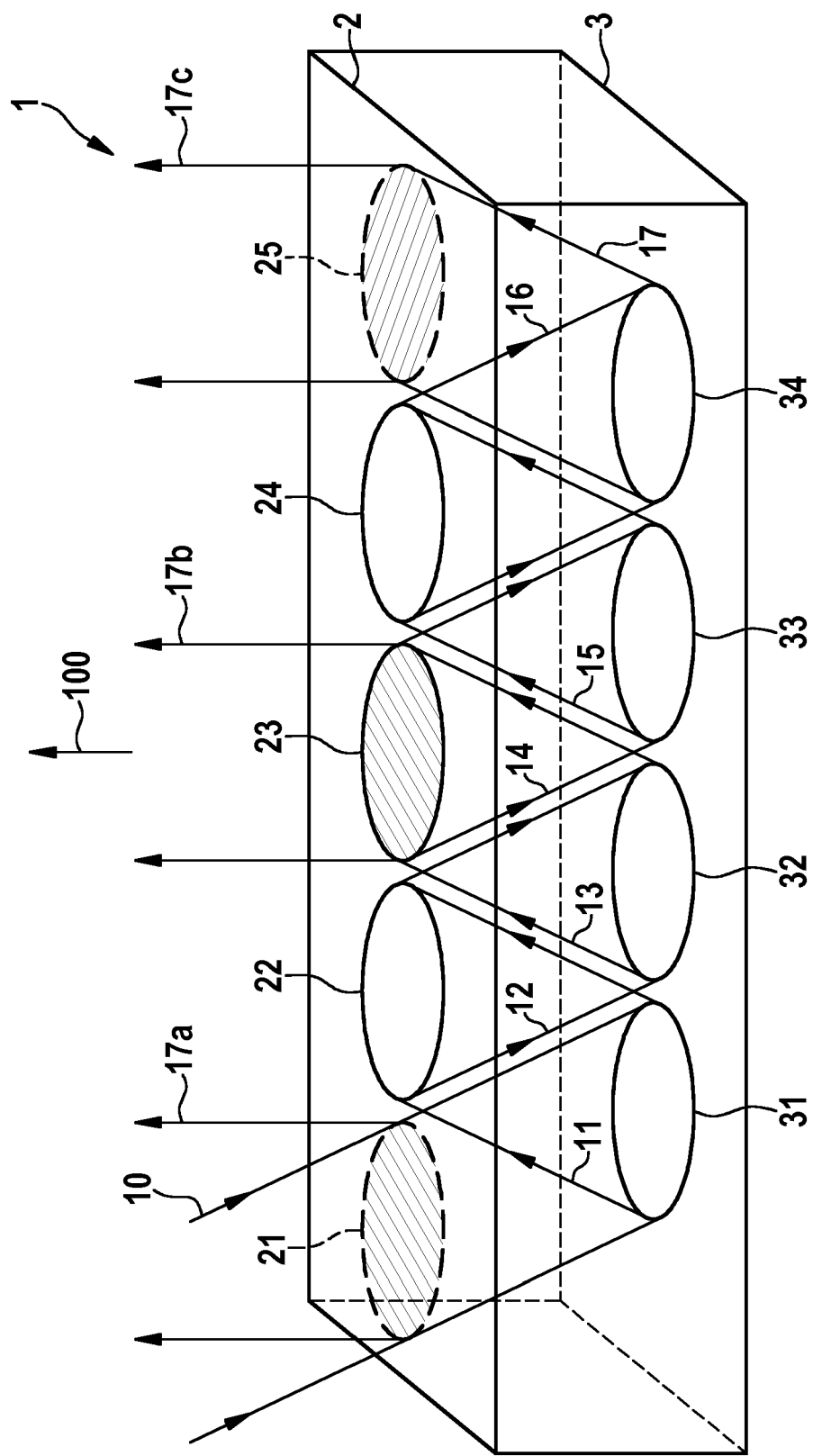
FIG. 2 shows an optical combination device in accordance with a specific embodiment of the present invention.

FIG. 2 shows an optical combination device in accordance with a specific embodiment of the present invention.

In detail, FIG. 2 essentially shows an optical combination device 1 in accordance with FIG. 1. In contrast to optical combination device 1 according to FIG. 1, in the case of optical combination device 1 according to FIG. 2, different optical functions are assigned at this stage to functional regions 21, 22, 23, 24, 25 of first layer 2 and to functional regions 31, 32, 33, 34 of second layer 3. On the one hand, functional regions 31, 32, 33, 34 of second layer 3 are all formed as reflection regions, i.e., a reflection function is provided for a correspondingly incident beam 12, 14, 16. Functional regions 21, 22, 23, 24, 25 of first layer 2 are formed here as follows: Incident beam 10 impinges on first functional region 21, which provides an optical splitting function therefore. A portion of beam 10 is transmitted in the direction of second layer 3, more precisely in the direction of region 31 of second layer 3; another portion is reflected in direction 100 as beam 17*a* in the direction of a first eyebox 5*a* of an eye 4 (see FIG. 3). Second functional region 22 of first layer 2, configured to the right, next to first region 21 and spaced apart therefrom, provides a reflection function for beam 11 incident thereon, i.e., incident beam 11 is reflected as beam 12 in the direction of second layer 3. Third functional region 23 of second layer 2 is formed analogously to first region 21 and provides a splitting function for the beam that is incident thereon upstream of 13, i.e., a portion is transmitted as outgoing beam 17*b* in the direction of a second eyebox 5*b* through first layer 2; a portion is reflected in turn as reflected beam 14 in the direction of second layer 3. Analogously to second functional region 22, functional region 24 configured next to functional region 23 is again formed as a reflection region. At this stage, fifth functional region 25 is formed as a transmission region, i.e., beam 17 reflected by second layer 3 is completely transmitted in the direction of a third eyebox 5*c*-beam 17*c*. Here, there is no new partial reflection in the direction of second layer 3.

Figure 3:
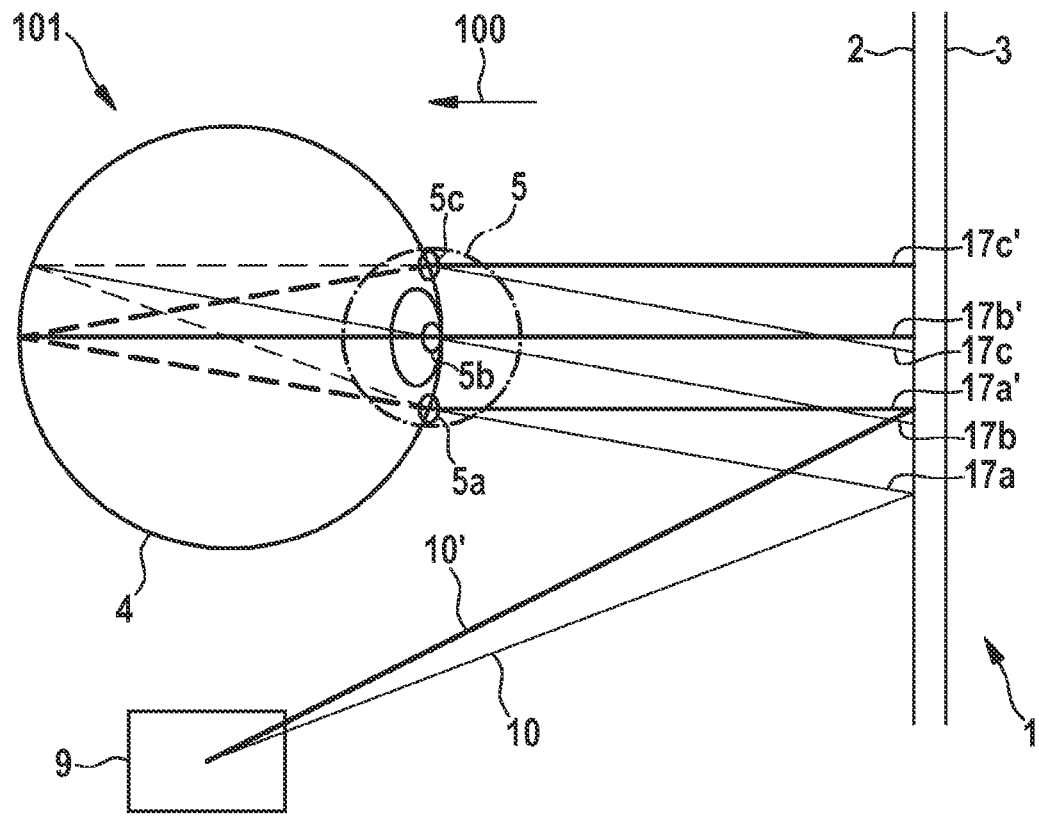
FIG. 3 shows a projection system in accordance with a specific embodiment of the present invention.

FIG. 3 shows a projection system in accordance with a specific embodiment of the present invention.

At this stage, FIG. 3 shows a projection system 101 having a laser scanning system 9 for providing an image and an optical combination device 1 in accordance with FIG. 2. Via laser scanning system 9, it emits beams, shown here exemplarily as beams 10, 10', at different angles in the direction of optical combination device 1. At first layer 2 of optical combination device 1, the incident beams are partially split in accordance with the description of FIG. 2, and propagated to different eye boxes 5*a*, 5*b*, 5*c* of an eye 4 as an impingement region. Here, as described in FIG. 2, the beams are partially propagated by reflection between the two layers 2, 3 of optical combination device 1 parallel to the direction of extent thereof and emerge again in corresponding regions from optical combination device 1 to form eyebox 5*a* by beams 17*a*, 17*a'*, eyebox 5*b* by beams 17*b*, 17*b'* and eyebox 5*c* by beams 17*c*, 17*c'*.

Figure 4:
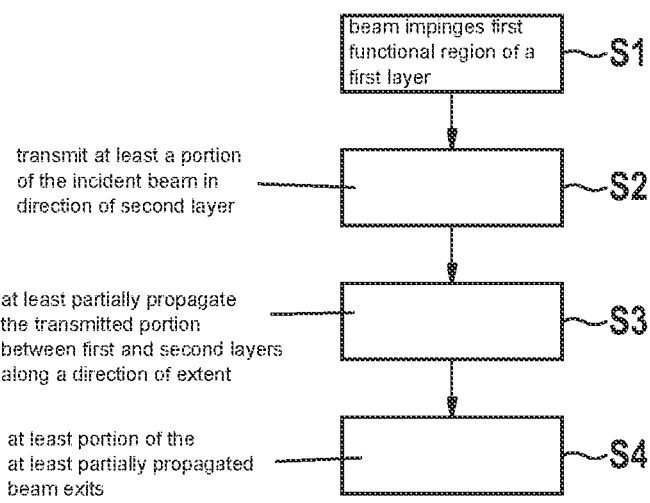
FIG. 4 shows steps of a method in accordance with a specific embodiment of the present invention.

FIG. 4 shows steps of a method in accordance with a specific embodiment of the present invention.

FIG. 4 schematically shows a method for projecting an image into a specific impingement region, in particular into an eye of a person. The method thereby includes the following steps.

In a first step S1, a beam impinges on a first functional region of a first layer.

In a further step S2, at least a portion of the incident beam is transmitted in the direction of a second layer via the first functional region of the first layer, the second layer being configured at a distance to the first layer; and the second layer being more distant to the impingement region than the first layer.

In a further step S3, the transmitted portion of the incident beam is at least partially propagated between the first and second layers along a direction of extent of the at least two layers.

In a further step S4, at least a portion of the at least partially propagated beam exits via a second functional region of the first layer in the direction of the impingement region, the second functional region being spatially separate from the first functional region.

In summary, at least one of the specific embodiments of the present invention has at least one of the following advantages:

compact design;
reliable projection;
cost-effective manufacturing;
large eyebox.

Although the present invention has been described with reference to preferred exemplary embodiments, it is not limited thereto, but may be modified in numerous ways.

What is claimed is:

1. An optical combination device for projecting an image onto a specific impingement region, the impingement region being an eye of a person, the device comprising:
   at least a first layer and a second layer which are mutually spaced apart at a distance, the first layer having a shorter distance to the impingement region than the second layer, the first layer having at least two functional regions, a first functional region of the at least two functional regions and a second functional region of the at least two functional regions being mutually spatially separate, the first layer and the second layer being configured to transmit a portion of a beam, which is incident on the first functional region, in a direction of the second layer, and to propagate the transmitted portion between the first layer and the second layer at least partially along a direction of extent of the first and second layers, and to provide the at least partially propagated beam as outgoing beam in a direction of the impingement region via the second functional region of the first layer,
   wherein the beam is reflected back and forth between the first layer and the second layer,
   wherein a diameter of a respective functional region is smaller than a distance of a spacing apart of adjacent functional regions.

2. The optical combination device as recited in claim 1, wherein the at least two functional regions of the first layer are formed to each provide a splitting or a transmission function.

3. The optical combination device as recited in claim 1, at least one functional region is formed to provide a position-dependent and/or incident angle-dependent optical function for an incident beam.

4. The optical combination device as recited in claim 1, wherein each of the functional regions includes one or a plurality of holograms.

5. The optical combination device as recited in claim 4, wherein the one or the plurality of holograms includes a multiplex hologram.

6. An optical combination device for projecting an image onto a specific impingement region, the impingement region being an eye of a person, the device comprising:
   at least a first layer and a second layer which are mutually spaced apart at a distance, the first layer having a shorter distance to the impingement region than the second layer, the first layer having at least two functional regions, a first functional region of the at least two functional regions and a second functional region of the at least two functional regions being mutually spatially separate, the first layer and the second layer being configured to transmit a portion of a beam, which is incident on the first functional region, in a direction of the second layer, and to propagate the transmitted portion between the first layer and the second layer at least partially along a direction of extent of the first and second layers, and to provide the at least partially propagated beam as outgoing beam in a direction of the impingement region via the second functional region of the first layer, wherein the first and second functional regions of the first layer are separated by at least a third region.

7. The optical combination device as recited in claim 6, the at least one third functional region of the first layer is formed as a reflection region in such a way that beams incident on the at least one third functional region are reflected.

8. An optical combination device for projecting an image onto a specific impingement region, the impingement region being an eye of a person, the device comprising:
at least a first layer and a second layer which are mutually spaced apart at a distance, the first layer having a shorter distance to the impingement region than the second layer, the first layer having at least two functional regions, a first functional region of the at least two functional regions and a second functional region of the at least two functional regions being mutually spatially separate, the first layer and the second layer being configured to transmit a portion of a beam, which is incident on the first functional region, in a direction of the second layer, and to propagate the transmitted portion between the first layer and the second layer at least partially along a direction of extent of the first and second layers, and to provide the at least partially propagated beam as outgoing beam in a direction of the impingement region via the second functional region of the first layer,
wherein the second layer includes at least a fourth functional region, which is formed as a reflection region.

9. The optical combination device as recited in claim 8, wherein all functional regions of the second layer are formed as reflection regions.

10. An optical combination device for projecting an image onto a specific impingement region, the impingement region being an eye of a person, the device comprising:
at least a first layer and a second layer which are mutually spaced apart at a distance, the first layer having a shorter distance to the impingement region than the second layer, the first layer having at least two functional regions, a first functional region of the at least two functional regions and a second functional region of the at least two functional regions being mutually spatially separate, the first layer and the second layer being configured to transmit a portion of a beam, which is incident on the first functional region, in a direction of the second layer, and to propagate the transmitted portion between the first layer and the second layer at least partially along a direction of extent of the first and second layers, and to provide the at least partially propagated beam as outgoing beam in a direction of the impingement region via the second functional region of the first layer,
wherein the distance between the first layer and the second layer and the first functional region of the first layer is formed such that, as a function of the angle of incidence, a projected cross-sectional area of the beam, which is incident on the second layer, is smaller than or equal to a functional region of the second layer.

11. A method for projecting an image onto a specific impingement region, the impingement region being an eye of a person, the method comprising the following steps:
impinging a beam on a first functional region of a first layer;
transmitting at least a portion of the impinged beam toward a second layer by the first functional region of the first layer, the second layer being configured at a distance to the first layer, and the second layer being more distant to the impingement region than the first layer;
at least partially propagating the transmitted portion of the impinged beam between the first and second layers along a direction of extent of the first and second layers; and
at least a portion of the at least partially propagated beam exiting via a second functional region of the first layer in a direction of the impingement region, the second functional region being spatially separate from the first functional region,
wherein the beam is reflected back and forth between the first layer and the second layer,
wherein a diameter of a respective functional region is smaller than a distance of a spacing apart of adjacent functional regions.

12. The method as recited in claim 11, wherein the at least partial propagation is carried out by functional regions of the first and second layers configured as reflection regions.

13. A projection system, comprising:
an illumination device configured to provide an image; and
an optical combination device configured to project the image of the illumination device into a specific impingement region, the impingement region being an eye of a person, the optical combination device including:
at least a first layer and a second layer which are mutually spaced apart at a distance, the first layer having a shorter distance to the impingement region than the second layer, the first layer having at least two functional regions, a first functional region of the at least two functional regions and a second functional region of the at least two functional regions being mutually spatially separate, the first layer and the second layer being configured to transmit a portion of a beam from the illumination device, which is incident on the first functional region, in a direction of the second layer, and to propagate the transmitted portion between the first layer and the second layer at least partially along a direction of extent of the first and second layers, and to provide the at least partially propagated beam as outgoing beam in a direction of the impingement region via the second functional region of the first layer,
wherein the beam is reflected back and forth between the first layer and the second layer,
wherein a diameter of a respective functional region is smaller than a distance of a spacing apart of adjacent functional regions.

\* \* \* \* \*